United States Patent [19]

Sasaki et al.

[11] Patent Number: 4,696,870
[45] Date of Patent: Sep. 29, 1987

[54] SOLUTION CIRCULATION TYPE METAL-HALOGEN BATTERY

[75] Inventors: Torahiko Sasaki, Susono; Kazuo Sato, Numazu; Masahiro Ohkawa, Okazaki; Yoshihiro Suzuki, Susono; Masato Kubota, Susono; Hatsuo Nakao, Susono; Kyoichi Tange, Susono, all of Japan

[73] Assignee: Toyota Jidosha Kabushiki Kaisha, Aichi, Japan

[21] Appl. No.: 837,267

[22] Filed: Mar. 7, 1986

[30] Foreign Application Priority Data

Mar. 12, 1985 [JP] Japan .................. 60-35981[U]
Mar. 25, 1985 [JP] Japan .................. 60-42482[U]

[51] Int. Cl.$^4$ .................................................. H01M 8/04
[52] U.S. Cl. ...................................... 429/14; 429/34; 429/72
[58] Field of Search .................. 429/14, 34, 72

[56] References Cited

U.S. PATENT DOCUMENTS 4,403,018 9/1983 Alfenaar et al. .................. 429/34
4,461,817 7/1984 Itoh et al. .................. 429/72 X

FOREIGN PATENT DOCUMENTS 57-23476 2/1982 Japan .................. 429/34
57-115772 7/1982 Japan .

Primary Examiner—Brian E. Hearn
Assistant Examiner—Stephen J. Kalafut
Attorney, Agent, or Firm—Parkhurst & Oliff

[57] ABSTRACT

Disclosed is a solution circulation type metal-halogen battery in which an electrolyte is circulated between a reaction tank and an electrolyte storage tank. This battery has a first group of rectifying plates and a second group of rectifying plates aligned in a row, respectively, so as to partition between the inlet of the electrolyte and the reaction tank and between the outlet thereof and the reaction tank, respectively. These first and second groups of rectifying plates are formed in such a manner that the interval between the respective rectifying plates increases in accordance with a predetermined functional equation in the direction of moving away from the inlet or outlet side of the electrolyte. This apparatus equalizes the flow rate and velocity of the electrolyte flowing through the reaction tank, thereby preventing the occurrence of an overvoltage or a faulty deposition of metal resulting from the non-uniform flow of the electrolyte.

8 Claims, 19 Drawing Figures

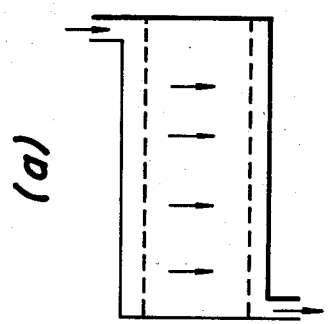
FIG. 6
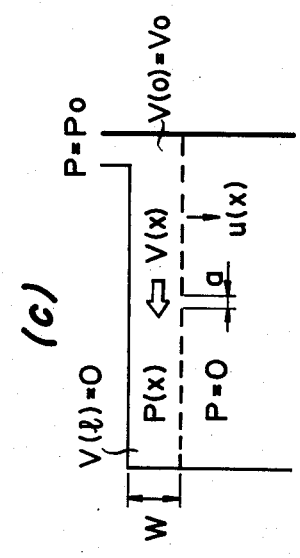
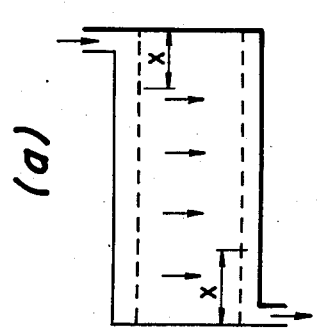
FIG. 14
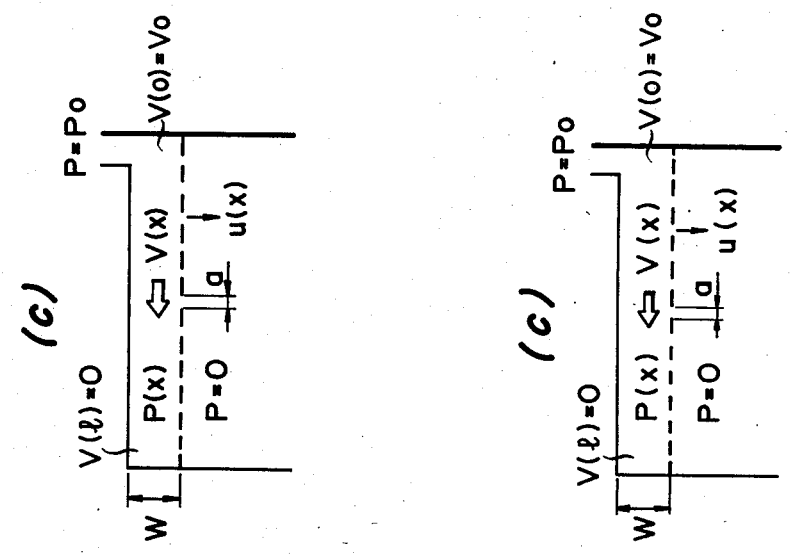

$$k(x) \propto \frac{1}{(x-\ell)^2 + A^2}$$

| $d_1$ | $d_2$ | $d_3$ | $d_4$ | $d_5$ | $d_6$ | $d_7$ |
|---|---|---|---|---|---|---|
| 0.3 | 0.3 | 0.3 | 0.4 | 0.4 | 0.5 | 0.5 |
| $d_8$ | $d_9$ | $d_{10}$ | $d_{11}$ | $d_{12}$ | $d_{13}$ | $d_{14}$ |
| 0.6 | 0.6 | 0.7 | 0.8 | 0.9 | 1.0 | 1.2 |
| $d_{15}$ | $d_{16}$ | $d_{17}$ | $d_{18}$ | $d_{19}$ | $d_{20}$ | $d_{21}$ |
| 1.4 | 1.6 | 1.8 | 2.1 | 2.5 | 2.8 | 3.2 |
| $d_{22}$ | $d_{23}$ | $d_{24}$ | | | | |
| 3.6 | 3.8 | 3.9 | (mm) | | | |

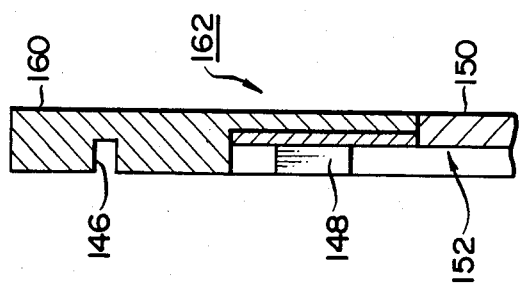
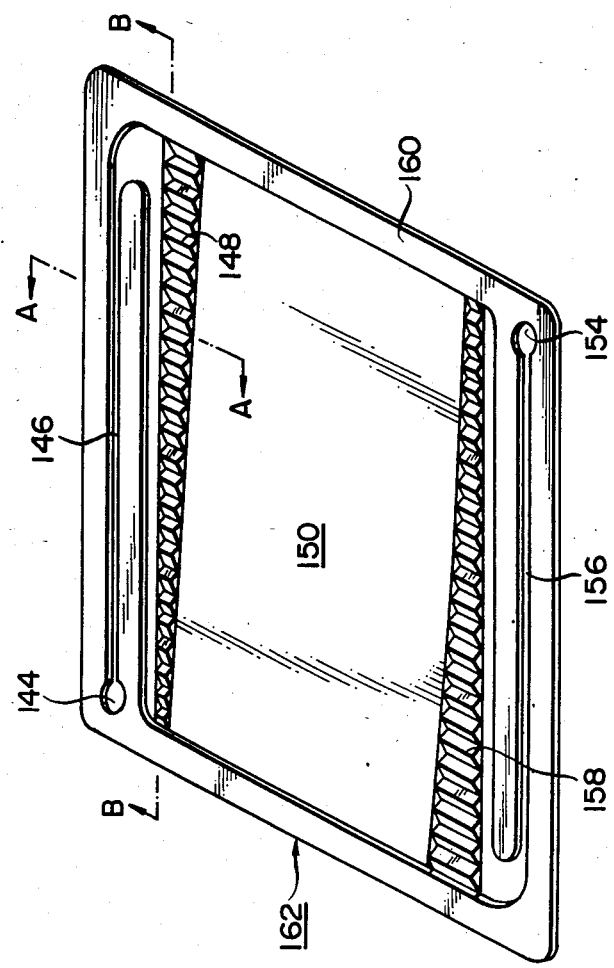

FIG. 11
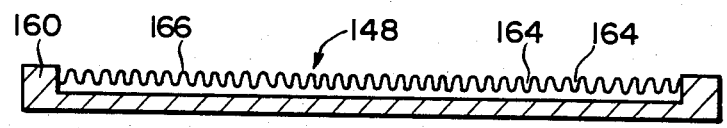
FIG. 12
(a)
(b)
FIG. 13
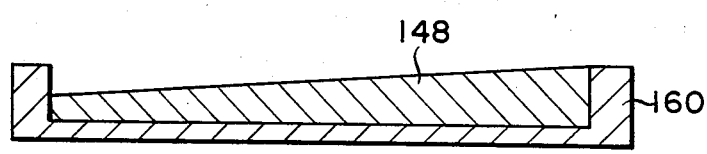

SOLUTION CIRCULATION TYPE METAL-HALOGEN BATTERY

BACKGROUND OF THE INVENTION

1. Field of the Invention

The present invention relates to a solution circulation type metal-halogen battery, and more particularly to a solution circulation type-halogen battery wherein the flow rate and the velocity distribution of an electrolyte flowing through a reaction tank are equalized.

2. Description of the Prior Art

As conventional metal-halogen batteries, a zinc-bromine secondary battery and a zinc-chlorine secondary battery are known. In such a secondary battery, single cells are connected to each other in series or parallel, as required, so as to obtain a practical voltage and current. These secondary batteries are frequently used as bipolar-type layer-built batteries as well.

The basic principle of the aforementioned metal-halogen battery will be explained with reference to FIG. 3.

In FIG. 3, a cathode 12 and an anode 14 in a reaction tank 10 are partitioned into a cathode chamber 10a and an anode chamber 10b by means of a separator 16. Electrolyte circulation passages are formed to connect the reaction tank 10, an anolyte storage tank 18, and a catholyte storage tank 20 by means of pipes 22. In this case, the electrolyte flowing through the pipes 22 is pressure-fed to the reaction tank by means of pumps 24a and 24b.

Furthermore, in the reaction tank during charge, halogen is generated on the cathode side, while metal is deposited on the anode side.

At the time of discharge, the metal deposited on an anode side is oxidated and dissolved in the form of metallic ions in the electrolyte, while halogen in the electrolyte is reduced and dissolved in the form of halogen ions in the electrolyte.

FIG. 4 is an exploded view of a conventional electrolyte circulation type layer-built secondary battery based on the above-described principle.

In FIG. 4, an electrode plate 26 is constituted by an insulating portion 28 and a conductive portion 30, and manifolds 32 are provided on a diagonal thereof. In addition, the separator 34 has a separator frame 36 in the periphery of a separator membrane 34a, and manifolds 38 and channels 40, which supply the electrolyte to the cathode chamber and the anode chamber, are formed in the separator frame 36.

Thus, in a metal-halogen battery, the electrolyte circulates through the passages where the electrolyte flows from the electrolyte tank, passes each chamber of a cell stack, and returns to the electrolyte tank. However, since the electrolyte flows through the cathode and anode chambers with a thickness of 1 mm or thereabout in the layered plate, an overvoltage or non-uniform electrodeposition may occur unless the flow in each chamber is uniform, thereby presenting an undesirable situation for the battery.

Furthermore, in view of the need to prevent a shunt current, the inlet and outlet of the electrolyte are conventionally provided on the upper and lower corners of a cell such as to be disposed on a diagonal, as shown in FIG. 4. In addition, if the area of the conductive portion 30 of the electrode becomes large in the order of 600 to 1,200 cm$^2$, it has been difficult to cause the electrolyte to flow uniformly.

As a means of solving this problem, there has been suggested a metal-halogen battery in which a group of rectifying plates 42 are formed between the channel 40 and the separator membrane 31a, as shown in FIG. 5. This arrangement allows a uniform distribution of the velocity and flow rate of the electrolyte in the respective cathode and anode chambers.

However, the prior art has had the following drawbacks.

First, conventional groups of rectifying plates are constituted by a plurality of rows of rectifying plates, as shown in FIG. 5, because of the difficulty to effect rectification in such a manner as to obtain a uniform distribution of the velocity.

If the groups of rectifying plates 42 are thus constituted by the plurality of rows of rectifying plates, the vertical width of the rectifying plates becomes large. Consequently, there has been a problem in that such a battery is unsuitable for use in an electric vehicle or a forklift for which a battery with a low height, when mounted thereon, is preferred.

In addition, if the groups of rectifying plates 42 are constituted by the plurality of rows of rectifying plates, gas may be retained between the plurality of rows, and this gas serves as a factor in impeding the flow of the electrolyte.

Secondly, the conventional groups of rectifying plates 42 are formed integrally with the separator frame or an electrode frame. Moreover, the structure of the groups of rectifying plates 42 has been very complicated. For these reasons, there has been a drawback since a large amount of processing is involved in the production of the separator frame or electrode frame.

SUMMARY OF THE INVENTION

Accordingly, the present invention has been devised to overcome the aforementioned problems, and a first object of the present invention is provide a solution circulation type metal-halogen battery which has a uniform flow rate and velocity of an electrolyte flowing through a reaction tank, by the use of a rectifier with a small vertical width.

A second object of the present invention is to provide a solution circulation type metal-halogen battery in which, by employing a simple means of installing this rectifier at the time of assembling a battery after forming in advance the rectifier separately from a separator frame or an electrode frame, the flow rate and velocity of an electrolyte flowing through a reaction tank therein is equalized.

To attain the first object of the present invention, the present invention provides a solution circulation type metal-halogen battery in which an electrolyte is circulated between a reaction tank and an electrolyte storage tank, characterized in that a first group of rectifying plates and a second group of rectifying plates each aligned in a row are provided between the inlet of the electrolyte and the reaction tank and between the outlet thereof and the reaction tank, respectively, such as to partition them, the intervals between each of said rectifying plates in the first and second groups of rectifying plates being formed in such a manner as to increase in accordance with a predetermined functional equation in the direction of moving away from the inlet or outlet of the electrolyte.

In addition, to attain the second object of the present invention, the present invention provides a solution circulation type metal-halogen battery in which an electrolyte is circulated between a reaction tank and an electrolyte storage tank, characterized in that a rectifier for equalizing the flow of the electrolyte in the reaction tank is disposed between the reaction tank and the inlet of the electrolyte and between the reaction tank and the outlet thereof, respectively, the rectifier being formed in advance separately from a body frame and adapted to be installed in and secured to a predetermined portion thereof during assembly.

The above and other objects, features and advantages of the present invention will become clear from the following description of the preferred embodiments thereof, taken in conjunction with the accompanying drawings.

BRIEF DESCRIPTION OF THE DRAWINGS

FIG. 6(a) is a schematic diagram explaining the solution circulation type battery;

FIG. 6(b) is a view showing the pressure distribution thereof;

FIG. 6(c) is a diagram explaining reference characters;

FIG. 9 is an external view of the essential parts of a second embodiment of a solution circulation type metal-halogen battery according to the present invention;

FIG. 10 is a cross sectional view taken along the line A—A of FIG. 9;

FIG. 11 is a cross-sectional view taken along the line B—B of FIG. 9;

FIGS. 12(a) and (b) and FIG. 13 are views illustrating a cross sectional configuration of a rectifier of another embodiment;

FIG. 14(a) is a schematic diagram explaining a solution circulation type battery;

FIG. 14(b) is a diagram illustrating the pressure distribution thereof; and

FIG. 14(c) is a diagram explaining reference characters.

DESCRIPTION OF THE PREFERRED EMBODIMENTS

Preferred embodiments of the present invention will be described hereinunder with reference to the accompanying drawings.

First Embodiment

A solution circulation type metal-halogen battery according to the present invention is provided with a first group of rectifying plates and a second group of rectifying plates which are disposed between the inlet of an electrolyte and a reaction tank and between the outlet thereof and the reaction tank, respectively, in such a manner as to partition them and to be aligned in a row, respectively. By aligning the groups of rectifying plates in respective rows, the present invention has advantages in that the structure of a rectifying section can be simplified and that the area occupied by the rectifying section can be checked to a minimum.

In this case, the electrolyte circulates between an electrolyte storage tank and the reaction tank. When such an electrolyte flows into or out of the reaction tank, the intervals between respective rectifying plates in these first and second groups of rectifying plates where the electrolyte passes are small at the portion close to the inlet and become gradually larger as they move away from the inlet.

For this reason, the pressure of the electrolyte after passing through the aforementioned intervals becomes uniform in all places inside the reaction tank, so that the flow of the electrolyte is equalized. In consequence, a metal is deposited uniformly on the anode side, thereby making it possible to prevent the occurrence of an overvoltage.

Furthermore, since the aformentioned interval is formed to vary in accordance with a predetermined functional equation, it becomes possible to readily produce a solution circulation type metal-halogen battery irrespective on the relative size of its structure without any need to fabricate said battery on a trial-manufacture basis.

A first embodiment of the present embodiment will now be described hereinunder with reference to the accompanying drawings.

Figure 1:
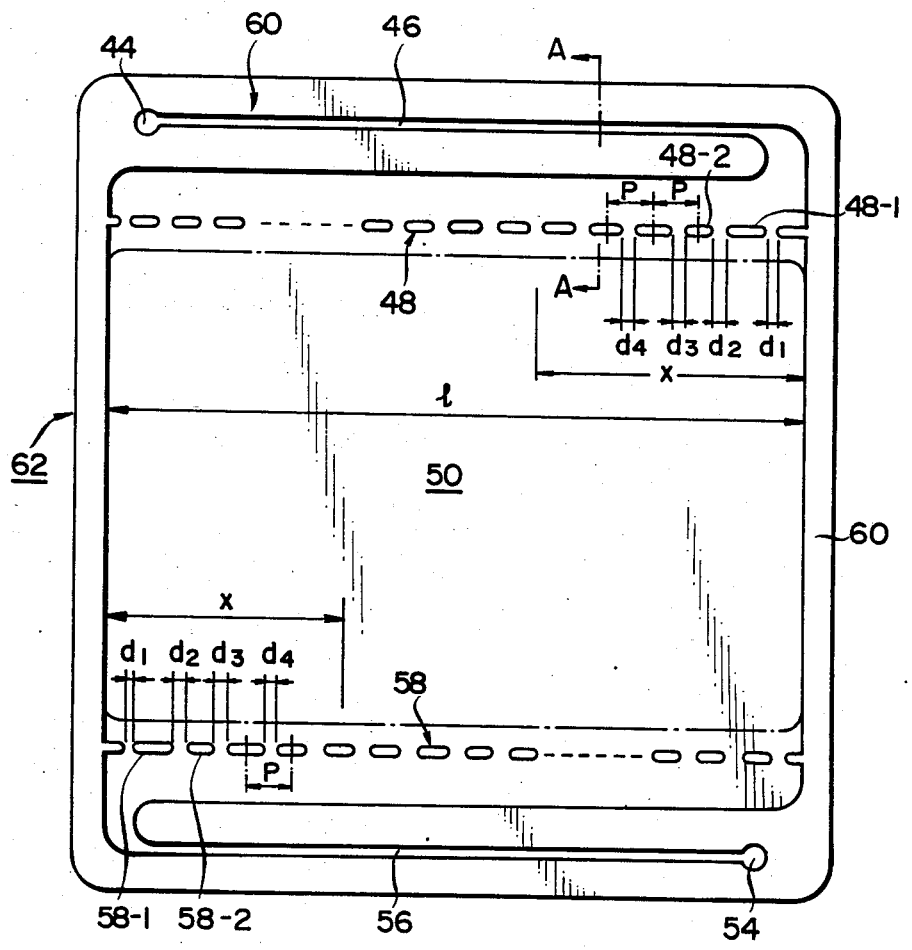
FIG. 1 is an explanatory view of essential portions of a first embodiment of a solution circulation type metal-halogen battery according to the present invention.
Figure 3:
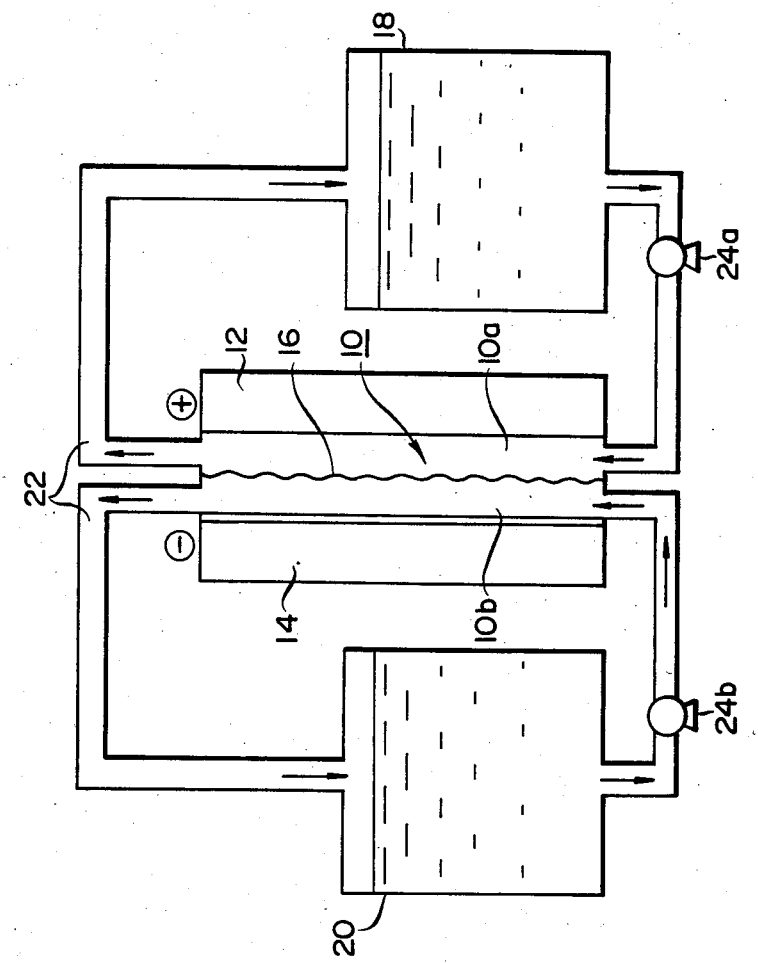
FIG. 3 is an explanatory view of the basic principle of a solution circulation type battery.
Figure 2:
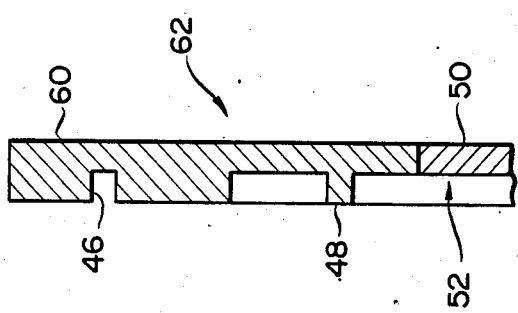
FIG. 2 is a cross-sectional view taken along the line A—A of FIG. 1.
Figure 4:
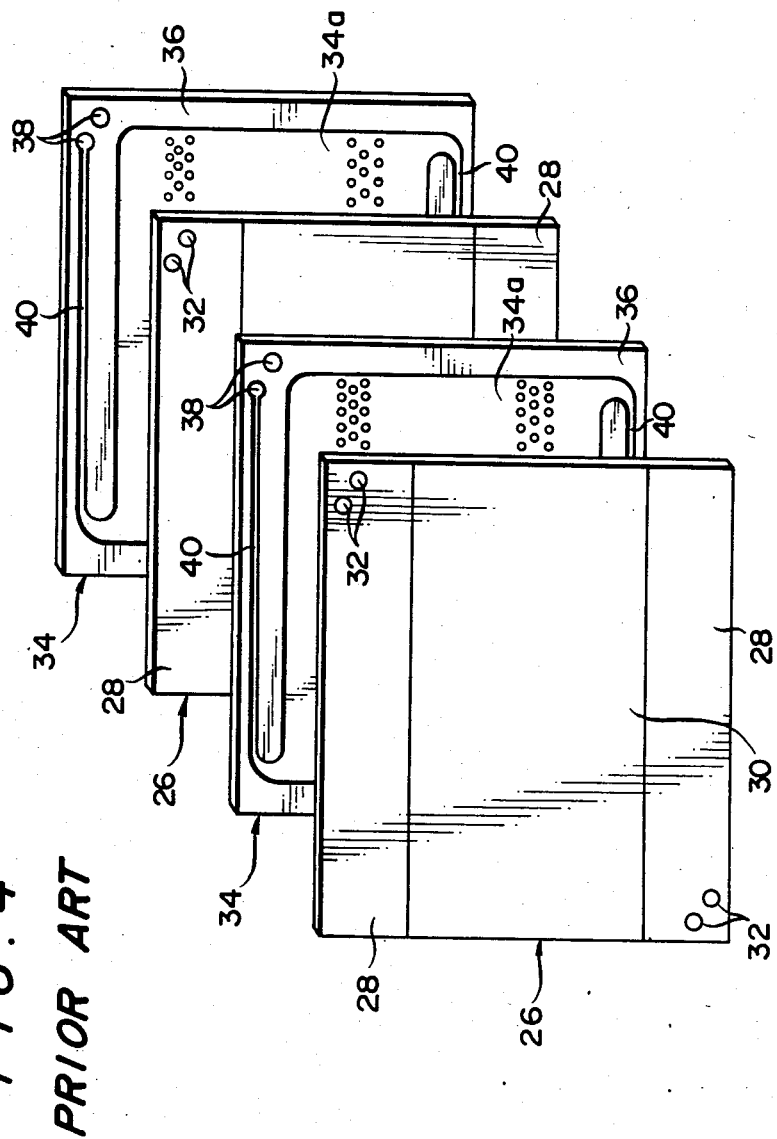
FIGS. 4 and 5 are exploded perspective views of a conventional layer-built type solution circulation type metal-halogen battery.
Figure 5:
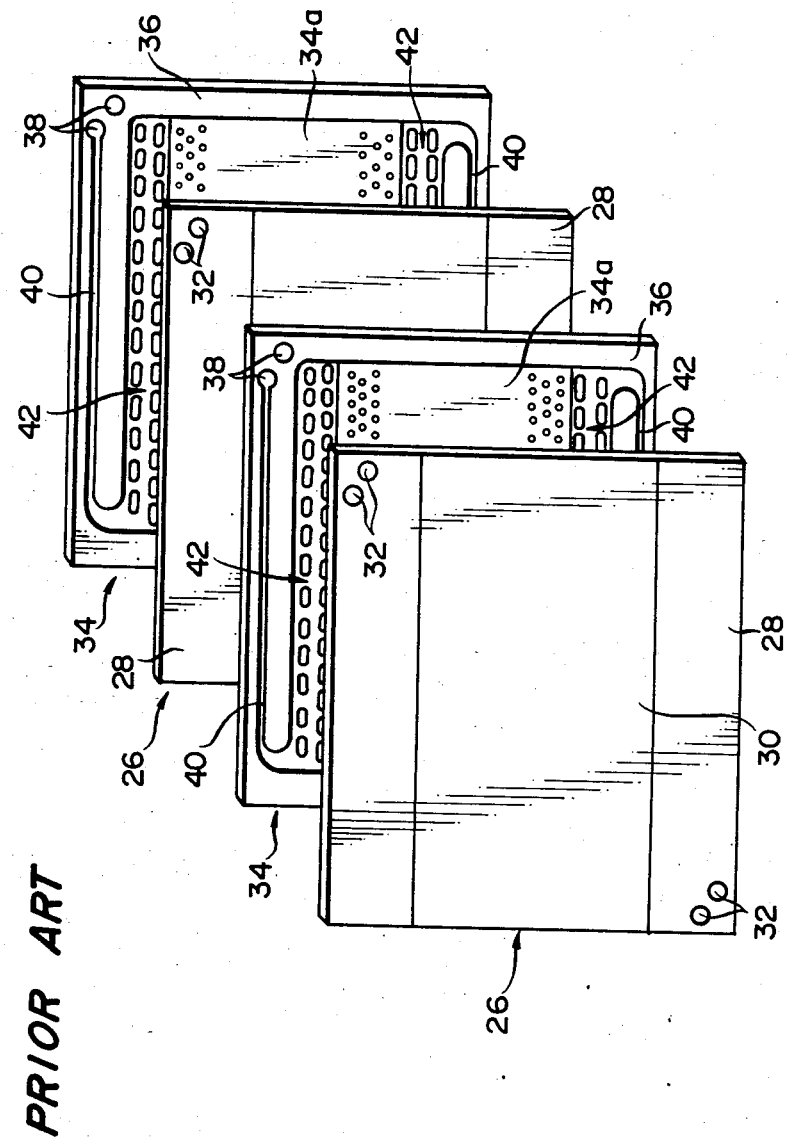

FIG. 1 is an explanatory view of the essential portions of a solution circulation type metal-halogen battery according to this embodiment.

In this figure, a separator 62 is constituted by a separator membrane 50 and a separator frame 60 provided on the external periphery of the separator membrane 50 so as to hold the separator membrane 50.

Disposed respectively in the upper and lower portions of the separator 62 in FIG. 1 are groups of rectifying plates 48, 58, inlet- and outlet-side channels 46, 56, and inlet- and outlet-side manifolds 44, 54 which are respectively in a positional relationship of a point symmetry about the center of the separator membrane 50.

The electrolyte flows from an electrolyte storage tank (not shown) into a reaction tank (52) formed between the separator membrane 50 and an electrolyte plate (not shown). After the electrolyte is subjected to an electrochemical reaction here, the electrolyte moves while being pressure-fed through a circulating passage for returning to the electrolyte storage tank.

In other words, the electrolyte circulates in the passages leading from the electrolyte storage tank to the electrolyte storage tank via the inlet-side manifold 44, the inlet-side channel 46, the group of inlet-side rectifying plates 48, the reaction tank (52), the group of outlet-side rectifying plates 58, the outlet-side channel 56, and the outlet-side manifold 54.

The characteristic features of the present invention reside in that the groups of rectifying plates 48, 58 serve as partitions between the inlet of the electrolyte and the reaction tank and between the outlet thereof and the reaction tank, respectively, and are both aligned in a row, and that the intervals between the respective rectifying plates 48-1, 48-2, . . . , and 58-1, 58-2, . . . are formed in such a manner as to increase in proportion to a predetermined functional equation as they become increasingly distant from the inlet- or outlet-side of the electrolyte.

In the present embodiment, the groups of rectifying plates 48, 58 are constituted by the plurality of rectifying plates 48-1, 48-2, ..., and 58-1, 58-2, ..., respectively, the height of these rectifying plates 48-1, 48-2, ..., and 58-1, 58-2, ... being made identical with the height of the aforementioned separator frame 60. This arrangement is to ensure that, when electrode plates are laminated consecutively on the front and rear sides of the separator frame 60, the separator frame 60 and the electrode plates will be adhered together so as to prevent the leakage of the electrolyte from the laminated portions. These electrode plates may also be provided with manifolds on a diagonal thereof.

In addition, assuming that the pitch P of the respective adjacent rectifying plates 48-1, 48-2, ..., and 58-1, 58-2, ... is fixed, an interval d between the respective rectifying plates is set in such a manner as to become greater in accordance with the following formula with an increase in x:

$$d = \frac{1}{(x-l)^2 + A^2} \quad (1)$$

where d is an interval between the respective rectifying plates; l is the horizontal width of the groups of rectifying plates as measured from the inlet or outlet of the electrolyte; x is a distance from the inlet or outlet of the electrolyte; and A is a coefficient of correction and is capable of taking the values of 0 to 1.

Figures 7, 8:
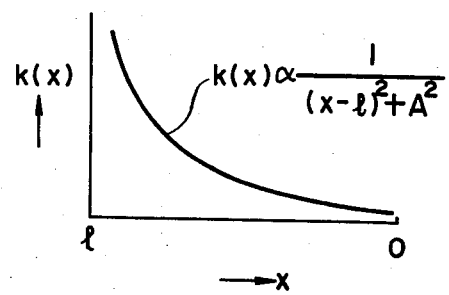
FIG. 7 is a diagram illustrating a relationship between the distance and the density of intervals.
FIG. 8 is an explanatory diagram illustrating the contents of d.

The value of d based on the above-described Formula (1) is shown in FIG. 8, where it is assumed that P=15 mm, l=350 mm, and A=100.

Next, the result of calculation for determining the Formula (1) will be described hereinunder.

First, a model of a solution circulation type battery is set, as shown in FIG. 6(a).

In the drawing, in order for the velocity of the electrolyte to be uniform, the pressure distribution thereof must show a rectilinear distribution in the entire region, as shown in FIG. 6(b).

Accordingly, a model calculation is made as to the distribution of the intervals in the direction of x for a certain density with the interval a fixed, allowing the amount of the electrolyte flowing through the interval to become constant in the direction of the arrow x and the pressure distribution to become rectilinear.

First, the following equation can be obtained by taking into account a balance between the change of the amount of the electrolyte passing through the passage and the amount of the electrolyte passing through and flowing out of the interval:

$$ak(x)u(x) + \frac{\partial V(x)}{\partial x} W = 0 \quad \text{①}$$

Also, since the amount of the electrolyte flowing through and out of the interval must be constant, the following equation holds:

$$k(x) \cdot u(x) = Cc = \text{constant} \quad \text{②}$$

In addition, pressure generated as a result of the electrolyte passing through the interval is:

$$P(x) = \lambda u(x) \quad \text{③}$$

Next, the pressure generated as a result of the electrolyte passing through the passage can be obtained from the the following equation:

$$\frac{dP(x)}{dx} = -\frac{12\mu}{h^2} V(x) \quad \text{④}$$

where
 $\lambda$: coefficient of proportion
 $\mu$: coefficient of viscosity
 h: thickness of a passage
 P: pressure
 W: width of a passage
 $P_0$: pressure at the inlet
 P(x): pressure at a distance x from the inlet
 $V_0$: amount of the electrolyte flowing in
 V(x): flow rate of the electrolyte at a distance x from the inlet
 V(l): flow rate at the end of a passage
 u(x): amount of the electrolyte flowing out of an interval
 a: dimension of an interval (constant)
 k(x): density of intervals If the aforementioned Formulae ②, ③, and ④ are substituted into the Formulae ①, $$aCc + W\frac{\partial}{\partial x}\left(-\frac{h^2 dP(x)}{12\mu dx}\right) = 0$$

$$aCc - \frac{h^2 \lambda W}{12\mu} \cdot \frac{d^2 u(x)}{dx^2} = 0$$

From these, it follows that $$\frac{d^2 u(x)}{dx^2} = \frac{12\mu a Cc}{\lambda W h^2} \equiv C_1$$

$$u(x) = \frac{C_1}{2} x^2 + C_2 x + C_3$$

$$k(x) = \left(\frac{C_1}{2} x^2 + C_2 x + C_3\right)^{-1} \times Cc$$

$$P(x) = \lambda \left(\frac{C_1}{2} x^2 + C_2 x + C_3\right)$$

$$V(x) = -\frac{h^2 \lambda}{12\mu}(C_1 x + C_2)$$

$$V(l) = 0, V(0) = V_0$$

Hence, $$C_2 = -\frac{12\mu}{h^2 \lambda} V_0, C_1 = \frac{12\mu}{h^2 \lambda l} V_0$$

From this equation, $$C_2 = -lC_1$$

$$\therefore V(x) = V_0\left(1 - \frac{x}{l}\right)$$

$$P(x) = \lambda\left(\frac{C_1}{2} x^2 + C_2 x + C_3\right)$$

$$= \lambda \left( \frac{C_1}{2} x^2 - C_1 lx + C_3 \right)$$

$$\therefore P(0) = \lambda C_3,$$

$$P(l) = \lambda \left( -\frac{C_1}{2} l^2 + C_3 \right)$$

$$u(x) = \frac{C_1}{2} x^2 - C_1 lx + C_3$$

$$= \frac{C_1}{2} (x - l)^2 - \frac{C_1}{2} l^2 + C_3$$

$$k(x) = Cc \times \left( \frac{C_1}{2} x^2 - C_1 lx + C_3 \right)^{-1}$$

$$= Cc \times \left\{ \frac{C_1}{2} (x - l)^2 - \frac{C_1}{2} l^2 + C_3 \right\}^{-1}$$

$$= \frac{Cc \cdot C_1}{2} \left( (x - l)^2 - l^2 + \frac{2C_3}{C_1} \right)^{-1}$$

Where, if $A^2$ is used for $$-l^2 + \frac{2C_3}{C_1},$$

the following formula holds:

$$k(x) = \frac{Cc \cdot C_1}{2} \frac{1}{(x - l)^2 + A^2}$$

$$k(x) \propto \frac{1}{(x - l)^2 + A^2}$$

In FIG. 7, a relationship between x and k(x) found by the above-described formulae is shown.

From this, the interval may be determined in such a manner as to be proportional to $$\frac{1}{(x - l)^2 + A^2}.$$

If the electrolyte flows excessively in the intervals located close to the far end, adjustment may be made in the size of $A^2$.

As described above, it has been found that, in the present embodiment, it is possible to obtain an equalized flow in the reaction tank 52 with the flow rate of the electrolyte being 100 l/mm or above, and that the following advantages can be attained.

(1) Is possible to obtain an equalized velocity distribution throughout an extensive flow region in the reaction tank 52.

(2) Since the flow of the electrolyte in the reaction tank 52 is equalized, the amount of metal deposited on the anode becomes uniform.

(3) Since the groups of rectifying plates are disposed in a row, respectively, the structure becomes simple and allows the area of the rectifying section to become small. For this reason, the overall size of the battery can also be made small.

(4) In the case of the conventional groups of rectifying plates disposed in a plurality of rows, it has been necessary to carry out experiments repeatedly on a trial-manufacture basis in order to determine appropriate intervals. In the present embodiment, however, the intervals can be determined readily on the basis of the aforementioned Formulae.

(5) In the structure of groups of rectifying plates disposed in a plurality of rows, gas is liable to be retained between the rows of rectifying plates, causing the flow of the electrolyte to be prevented by the gas. In a group of rectifying plates disposed in a row, however, the gas is not retained, so that the electrolyte flows smoothly.

(6) Since intervals between rectifying plates located adjacent to the inlet and outlet of the electrolyte are small, it becomes possible to reduce a shunt current.

As described above, in the present invention, since two groups of rectifying plates each aliged in a row are disposed between the inlet of the electrolyte and the reaction tank and between the outlet thereof and the reaction tank, respectively, and since the intervals of the respective rectifying plates are set in such a manner as to satisfy predetermined functional equations, it becomes possible to equalize the velocity distribution of the electrolyte in the reaction tank, thereby preventing the occurrence of an overvoltage and a faulty electro-deposition of metal resulting from the nonuniform flow of the electrolyte.

Second Embodiment

Next, a second embodiment of a metal-halogen battery according to the present invention will be described.

In a solution circulation type metal-halogen battery according to the present invention, rectifiers for equalizing the flow of an electrolyte in a reaction tank are disposed between the reaction tank and the inlet of the electrolyte and between the reaction tank and the outlet thereof, respectively.

These rectifiers are formed in advance separately from the body frame and are installed in and secured to predetermined portions of the body frame during assembly. For this reason, the structure of the body frame can be simplified, and the number of processes involved at the time of assembly can be reduced appreciably.

In addition, in the above description, the electrolyte circulated between the electrolyte storage tank and the reaction tank, and, at the time when such an electrolyte flows into or flows out of the reaction tank, the resistance of passages in these rectifiers where the electrolyte passes through is set in such a manner as to become large in portions close to the inlet and gradually smaller in the direction of moving away from the inlet.

For this reason, the pressure of the electrolyte after passing though the rectifier becomes equalized in all places in the reaction tank, and the flow of the electrolyte hence becomes equalized.

In consequence, the metal is deposited uniformly on the anode side, thereby allowing the occurrence of an over voltage to be prevented.

Referring now to the accompanying drawings, a second embodiment of the present invention will be described hereinunder.

FIG. 9 is an external view of the essential portions of a solution circulation type metal-halogen battery in accordance with the present invention.

In this figure, a separator 162 is constituted by a separator membrane 150 and a separator frame 160 provided on the external periphery of the separator membrane 150 so as to hold the separator membrane 150.

Disposed respectively in the upper and lower portions of the separator 162 in FIG. 9 are groups of rectifying plates 148, 158, inlet- and outlet-side channels 146, 156, and inlet- and outlet-side manifolds 144, 154 which are respectively in a positional relationship of a point symmetry about the center of the separator membrane 150.

The electrolyte flows from an electrolyte storage tank (not shown) into a reaction tank 152 formed between the separator membrane 150 and an electrolyte plate (not shown), as shown in FIG. 10. After the electrolyte is subjected to an electrochemical reaction here, the electrolyte moves while being pressure-fed through a circulating passage for returning to the electrolyte storage tank.

In other words, the electrolyte circulates in the passages leading from the electrolyte storage tank to the electrolyte storage tank via the inlet-side manifold 144, the inlet-side channel 146, the rectifier 148, the reaction tank 152, the rectifier 158, the outlet-side channel 156, and the outlet-side manifold 154.

The characteristic features of the present invention reside in that the rectifiers 148, 158 are installed and secured to the predetermined portions thereof at the time of assembly after being formed separately from the body frame.

In this embodiment, the rectifiers 148, 158 are formed in the identical shape, as shown in FIGS. 10 and 11, and passages 164 are formed by means of projections 166 formed on the surface of one plate with a wavelike cross section. These rectifiers 148, 158 are secured to predetermined positions of the separator frame 160 or an electrode frame by such securing means as adhesion.

The passages 164 are formed at fixed intervals in the flowing direction of the electrolyte, the length of the passages 164 being gradually shorter in the direction of moving away from the inlet or outlet of the electrolyte.

For this reason, at the time when the electrolyte flows into the side of the reaction tank 152 from the inlet of the electrolyte, it becomes necessary for the electrolyte adjacent to the inlet to pass a longer passage, with the result that the resistance of the passage becomes greater.

In contrast, the electrolyte flowing farther away from the inlet passes through a shorter passage, with the result that the resistance of the passage becomes smaller. Hence, as a whole, the influx of the electrolyte into the reaction tank 152 becomes equalized.

In addition, also when the electrolyte flows out from the reaction tank 152 to the side of the outlet of the electrolyte, the resistance of the passage adjacent to the outlet becomes greater, while the resistance of the passage farther away from the outlet is smaller.

In the above-mentioned arrangement, the cross-sectional configuration of the rectifier 148, 158 may be square, as shown in FIG. 12(a), or triangular, as shown in FIG. 12(b).

Furthermore, as shown in FIG. 13, the configuration may be such that the thickness of the cross section of the rectifier is continuously smaller in the direction of moving away from the inlet or outlet side of the electrolyte.

At first, a model of a solution circulation type battery is set, as shown in FIG. 6(a).

As described above, in this embodiment, the following advantages can be attained.

(1) Since the rectifiers are formed in advance separately from the body frame, and since these rectifiers are installed at the time of the assembly of the battery, the structure of the body frame can be simplified and production can be facilitated as a result.

(2) It becomes possible to obtain a uniform velocity distribution inside the reaction tank 152 in the overall region.

(3) Since the flow inside the reaction tank 152 is equalized, the amount of the metal deposited on the anode becomes uniform.

(4) With the structure of the conventional groups of rectifying plates disposed in a plurality of rows, gas is liable to be retained between the respective rectifying plates, causing the flow of the electrolyte to be hindered by the gas. In this embodiment, however, the gas is not retained and the electrolyte flows smoothly as a result.

Next, description will be made hereinunder of an example of calculation for finding the length of the passage 164 of the rectifiers 148, 158 so as to equalize the flow of the electrolyte inside the reaction tank.

In this example of calculation, an attempt is made to find how an interval d between respective rectifying plates will change when rectifying plates of the rectifier are aligned in a row and the pitch P of the respective rectifying plates is constant.

Accordingly, the model described below does not correspond directly to the present embodiment, but the technological means employed therein is identical and may be applied, as necessary.

Incidentally, 1 shall be the horizontal width of the rectifier as measured from the inlet or outlet of the electrolyte, and x shall be a distance from the inlet or outlet of the electrolyte.

First, a model of a circulation type battery is set, as shown in FIG. 14(a).

In the drawing, in order for the velocity of the electrolyte to be uniform, the pressure distribution thereof must show a rectilinear distribution in the entire region, as shown in FIG. 14(b).

Accordingly, a model calculation is made as to the distribution of the intervals in the direction of x for a certain density with the interval a fixed, allowing the amount of the electrolyte flowing through the interval to become constant in the direction of the arrow x and the pressure distribution to become rectilinear.

First, the following equation can be obtained by taking into account a balance between the change of the amount of the electrolyte passing through the passage and the amount of the electrolyte passing through and flowing out of the interval:

$$ak(x)u(x) + \frac{aV(x)}{ax} W = 0 \qquad \text{①}$$

Also, since the amount of the electrolyte flowing through and out of the interval must be constant, the following equation holds:

$$k(x) \cdot u(x) = Cc = \text{constant} \qquad \text{②}$$

In addition, pressure generated as a result of the electrolyte passing through the interval is:

$$P(x) = \lambda u(x) \qquad \text{③}$$

Next, the pressure generated as a result of the electrolyte passing through the passage can be obtained from the the following equation:

$$\frac{dP(x)}{dx} = -\frac{12\mu}{h^2} V(x) \quad ④$$

where
- $\lambda$: coefficient of proportion
- $\mu$: coefficient of viscosity
- h: thickness of a passage
- P: pressure
- W: width of a passage
- $P_0$ pressure at the inlet
- P(x): pressure at a distance x from the inlet
- V0: amount of the electrolyte flowing in
- V(x): flow rate of the electrolyte at a distance x from the inlet
- V(l): flow rate at the end of a passage
- u(x): amount of the electrolyte flowing out of an interval
- a: dimension of an interval (constant)
- k(x): density of intervals If the aforementioned Formulae ②, ③, and ④ are substituted into the Formulae ①, $$aCc + W\frac{\partial}{\partial x}\left(-\frac{h^2 dP(x)}{12\mu dx}\right) = 0$$

$$aCc - \frac{h^2\lambda W}{12\mu} \cdot \frac{d^2u(x)}{dx^2} = 0$$

From these, it follows that $$\frac{d^2u(x)}{dx^2} = \frac{12\mu a Cc}{\lambda W h^2} \equiv C_1$$

$$u(x) = \frac{C_1}{2} x^2 + C_2 x + C_3$$

$$k(x) = \left(\frac{C_1}{2} x^2 + C_2 x + C_3\right)^{-1} \times Cc$$

$$P(x) = \lambda\left(\frac{C_1}{2} x^2 + C_2 x + C_3\right)$$

$$V(x) = -\frac{h^2\lambda}{12\mu}(C_1 x + C_2)$$

$$V(l) = 0, V(0) = V_0$$

Hence, $$C_2 = -\frac{12\mu}{h^2\lambda} V_0, \quad C_1 = \frac{12\mu}{h^2\lambda l} V_0$$

From this equation, $$C_2 = -lC_1$$

$$\therefore V(x) = V_0\left(1 - \frac{x}{l}\right)$$

$$P(x) = \lambda\left(\frac{C_1}{2} x^2 + C_2 x + C_3\right)$$

$$= \lambda\left(\frac{C_1}{2} x^2 - C_1 l x + C_3\right)$$

$$\therefore P(0) = \lambda C_3,$$

$$P(l) = \lambda\left(-\frac{C_1}{2} l^2 + C_3\right)$$

$$u(x) = \frac{C_1}{2} x^2 - C_1 l x + C_3$$

$$= \frac{C_1}{2}(x - l)^2 - \frac{C_1}{2} l^2 + C_3$$

$$k(x) = Cc \times \left(\frac{C_1}{2} x^2 - C_1 l x + C_3\right)^{-1}$$

$$= Cc \times \left\{\frac{C_1}{2}(x - l)^2 - \frac{C_1}{2} l^2 + C_3\right\}^{-1}$$

$$= \frac{Cc \cdot C_1}{2}\left\{(x - l)^2 - l^2 + \frac{2C_3}{C_1}\right\}^{-1}$$

Where, if $A^2$ is used for $$-l^2 + \frac{2C_3}{C_1},$$

the following formula holds:

$$k(x) = \frac{Cc \cdot C_1}{2} \cdot \frac{1}{(x - l)^2 + A^2}$$

$$\therefore k(x) \propto \frac{1}{(x - l)^2 + A^2}$$

From this, the interval may be determined in such a manner as to be proportional to $$\frac{1}{(x - l)^2 + A^2}.$$

If the electrolyte flows excessively in the intervals located close to the far end, adjustment may be made in the size of $A^2$.

As has been described above, in the present invention, since rectifiers for equalizing the flow of an electrolyte in a rectifying tank are formed in advance separately from the body frame, and since these rectifiers are installed in and secured to predetermined portions at the time of the assembly of the battery, the structure of the body frame can be simplified, and productivity can be improved.

In addition, since the velocity distribution of the electrolyte in the reaction tank can be equalized, it is possible to prevent the occurrence of an overvoltage and a faulty deposition of metal resulting from the non-uniform flow of the electrolyte.

What is claimed is:
1. A solution circulation type metal-halogen battery in which an electrolyte is circulated between a reaction tank and an electrolyte storage tank, comprising a first group of rectifying plates and a second group of rectifying plates aligned in a row, respectively, provided between the inlet of said electrolyte and said reaction tank and between the outlet thereof and said reaction tank, such as to partition them, the intervals between each of said rectifying plates in said first and second groups of rectifying plates being such as to increase in accordance with a predetermined functional equation in the direction of moving from the inlet or outlet of said electrolyte.

2. A solution circulation type metal-halogen battery according to claim 1, wherein said functional equation is expressed by the following formula:

$$d = \frac{1}{(x-l)^2 + A^2}$$

where
- d: interval between said rectifying plates;
- l: width of said group of rectifying plates as measured from said inlet or outlet of said electrolyte;
- x: distance from said inlet or outlet of said electrolyte; and
- A: coefficient of correction.

3. A solution circulation type metal-halogen battery according to claim 1, wherein said battery is a solution circulation type layer-built secondary battery constituted by an insulating portion and a conductive portion and having an electrode plate provided with manifolds on a diagonal thereof and a separator frame in the external periphery of a separator membrane, said manifolds and channels being formed in said separator frame so as to supply said electrolyte to a cathode chamber and an anode chamber.

4. A solution circulation type metal-halogen battery according to claim 3, wherein said first and second groups of rectifying plates, inlet- and outlet-side channels, and inlet- and outlet-side manifolds are provided in the positional relationship of a point symmetry about the center of said separator membrane, respectively.

5. A solution circulation type metal-halogen battery according to claim 1, wherein said first and second groups of rectifying plates are constituted by a plurality of rectifying plates, respectively, said each rectifying plate being formed in such a manner that the height thereof is identical with the height of said separator frame, and also being formed in such a manner that said separator frame and said electrode plate are adhered together when said electrode plates are laminated on the front and rear sides of said separator frame, thereby preventing the leakage of said electrolyte from said laminated portion.

6. A solution circulation type metal-halogen battery in which an electrolyte is circulated between a reaction tank and an electrolyte storage tank, comprising a rectifier having a predetermined thickness for equalizing the flow of said electrolyte in said reaction tank disposed between said reaction tank and the inlet of said electrolyte and between said reaction tank and the outlet thereof, respectively, said rectifier being formed in advance separately from a body frame and adapted to be installed in and secured to a predetermined portion thereof during assembly and wherein passages are formed in said rectifier at predetermined intervals in the flowing direction of said electrolyte, the length of said passages becoming shorter as said passages move away from the inlet- or outlet-side of said electrolyte.

7. A solution circulation type metal-halogen battery according to claim 6, wherein said rectifier has a passage with a wavelike, triangular, or square cross-section.

8. A solution circulation type metal-halogen battery according to claim 6, wherein the thickness of said rectifier is gradually reduced in the direction of moving away from said inlet or outlet side of said electrolyte.

* * * * *